(12) United States Patent
Segev et al.

(10) Patent No.: US 10,337,841 B2
(45) Date of Patent: Jul. 2, 2019

(54) DIRECTED ENERGY WEAPON

(71) Applicant: RAFAEL ADVANCED DEFENSE SYSTEMS LTD., Haifa (IL)

(72) Inventors: Yehonatan Segev, Haifa (IL); Yochay Swirski, Haifa (IL); Shay Yosub, Haifa (IL); Yan Itovich, Haifa (IL)

(73) Assignee: RAFAEL ADVANCED DEFENSE SYSTEMS LTD., Haifa (IL)

( * ) Notice: Subject to any disclaimer, the term of this patent is extended or adjusted under 35 U.S.C. 154(b) by 265 days.

(21) Appl. No.: 15/502,786

(22) PCT Filed: Jul. 2, 2015

(86) PCT No.: PCT/IL2015/050682
§ 371 (c)(1),
(2) Date: Feb. 9, 2017

(87) PCT Pub. No.: WO2016/024265
PCT Pub. Date: Feb. 18, 2016

(65) Prior Publication Data
US 2017/0234658 A1    Aug. 17, 2017

(30) Foreign Application Priority Data
Aug. 10, 2014    (IL) .......................................... 234036

(51) Int. Cl.
| | | |
|---|---|---|
| *H01S 3/00* | (2006.01) | |
| *F41H 13/00* | (2006.01) | |
| *H01S 3/067* | (2006.01) | |
| *H01S 3/23* | (2006.01) | |

(52) U.S. Cl.
CPC ....... *F41H 13/0062* (2013.01); *H01S 3/0071* (2013.01); *H01S 3/067* (2013.01); *H01S 3/2383* (2013.01); *H01S 3/005* (2013.01)

(58) Field of Classification Search
CPC .......... H01S 3/0071; H01S 3/067; H01S 3/23; H01S 3/2383; F41H 13/0043; F41H 13/005; F41H 13/0062
USPC .................................. 250/203.2, 206.1, 221
See application file for complete search history.

(56) References Cited

U.S. PATENT DOCUMENTS 10,095,016 B2 *   10/2018   Karlsen .............. G02B 19/0052
2010/0282942 A1    11/2010   Taylor

FOREIGN PATENT DOCUMENTS

WO        2014071906 A1    5/2014

* cited by examiner

*Primary Examiner* — Kevin K Pyo
(74) *Attorney, Agent, or Firm* — Mark M. Friedman

(57) ABSTRACT

A directed energy weapon includes a number of laser units, each including a fiber laser generating an output beam with a power of at least 1 kW from a fiber, an objective lens arrangement for focusing the output beam into a focused beam directed towards a target, and a fine adjustment mechanism for adjusting a direction of the focused beam. A beam deflector arrangement is deployed to deflect a portion of the focused beam from each laser unit as a deflected beam in a direction in predefined relation to a direction of the focused beam. An angle sensing unit generates an output indicative of a current direction of said deflected beam for each of said laser units. A controller actuates the fine adjustment mechanisms based on the output from the angle sensing unit to maintain a desired relative alignment between directions of the focused beams.

17 Claims, 13 Drawing Sheets

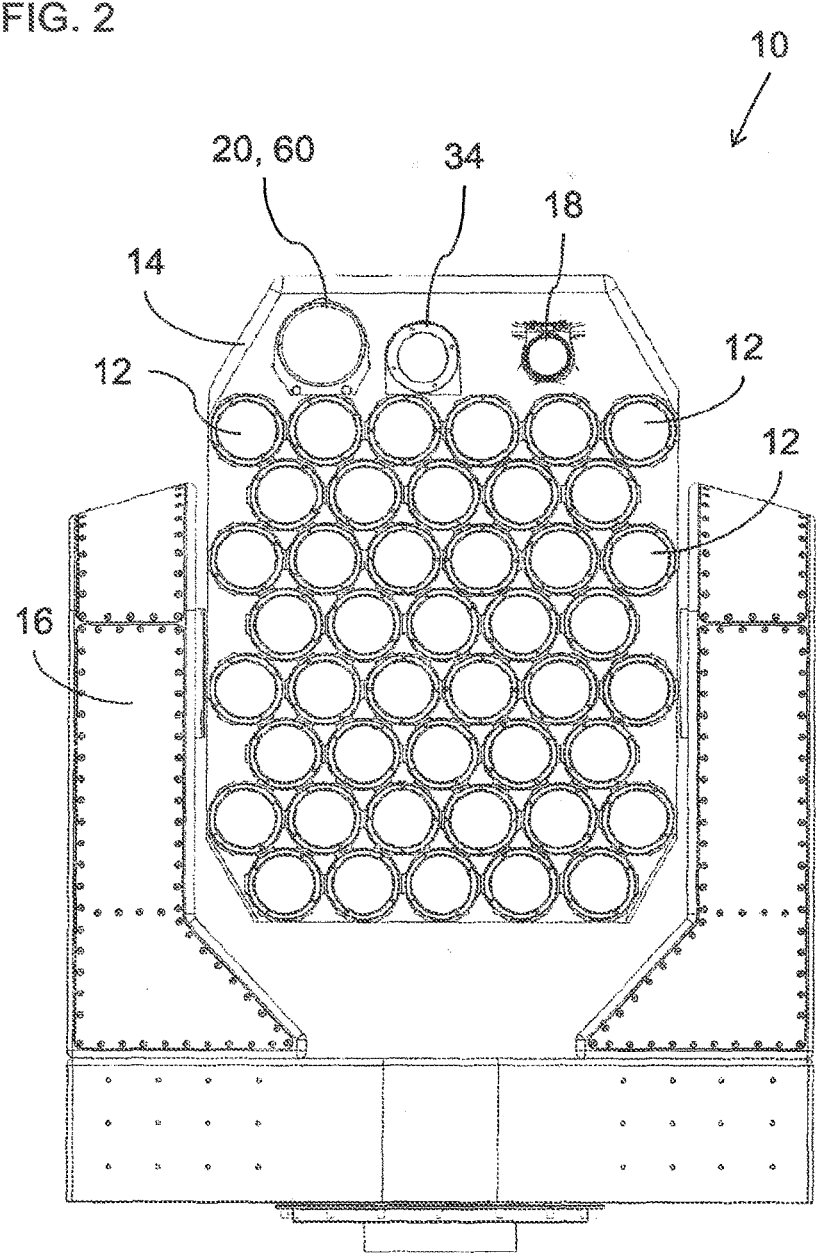

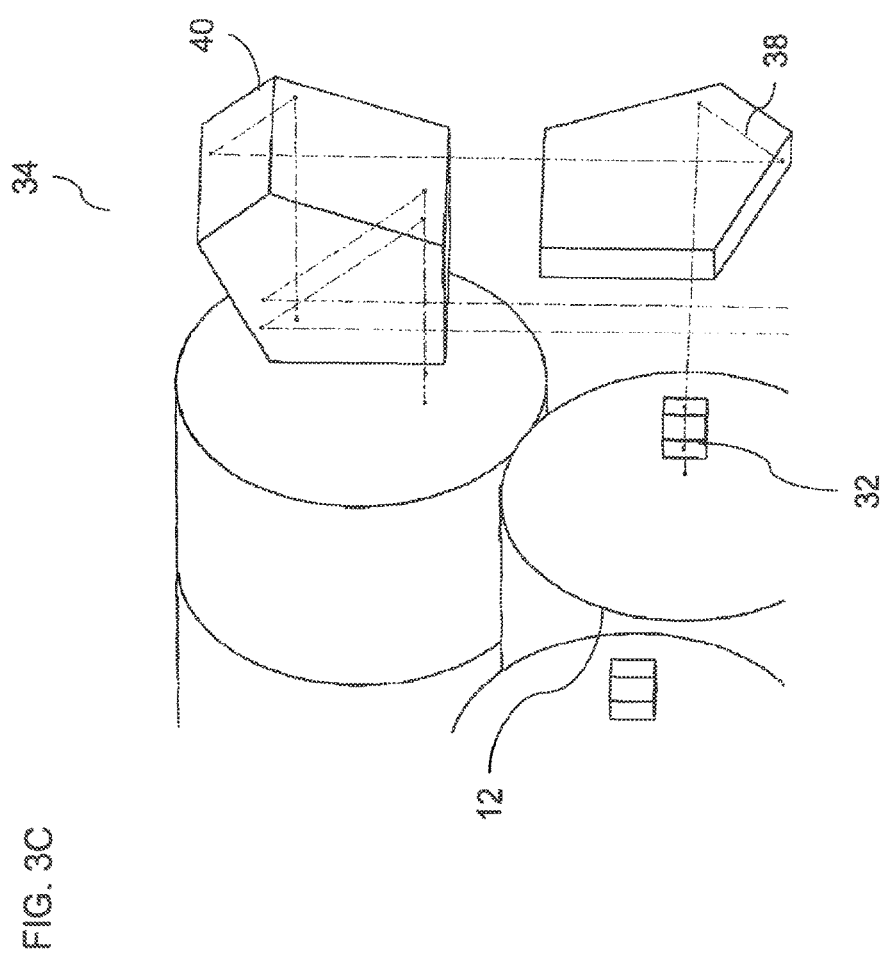

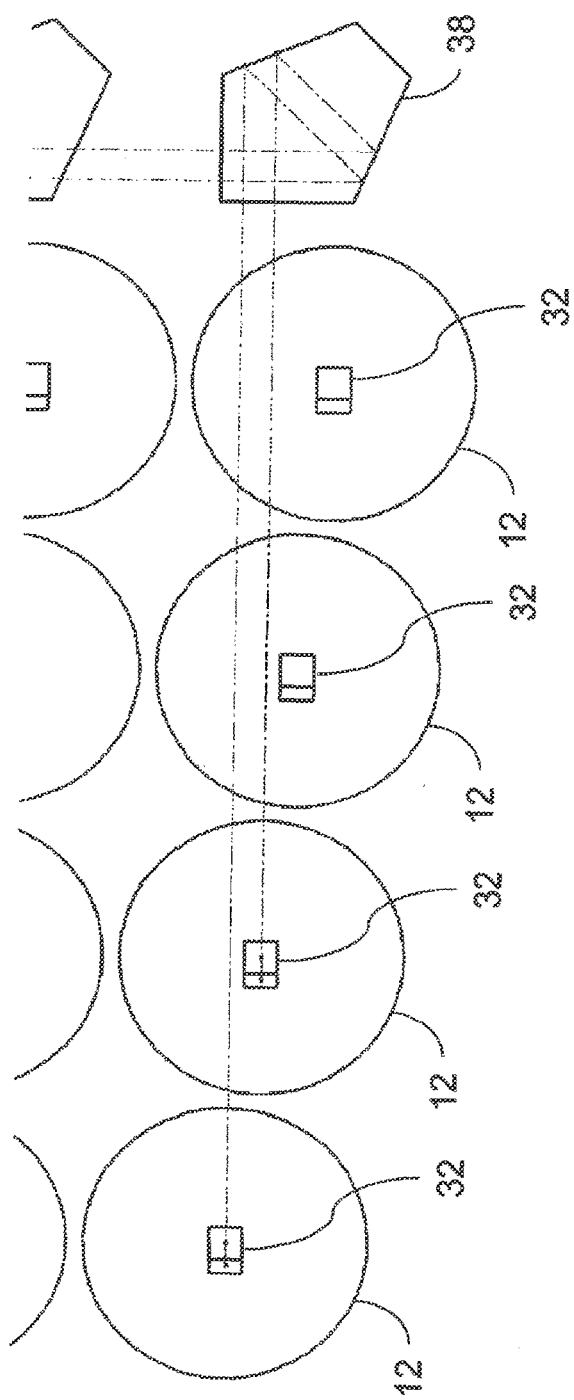

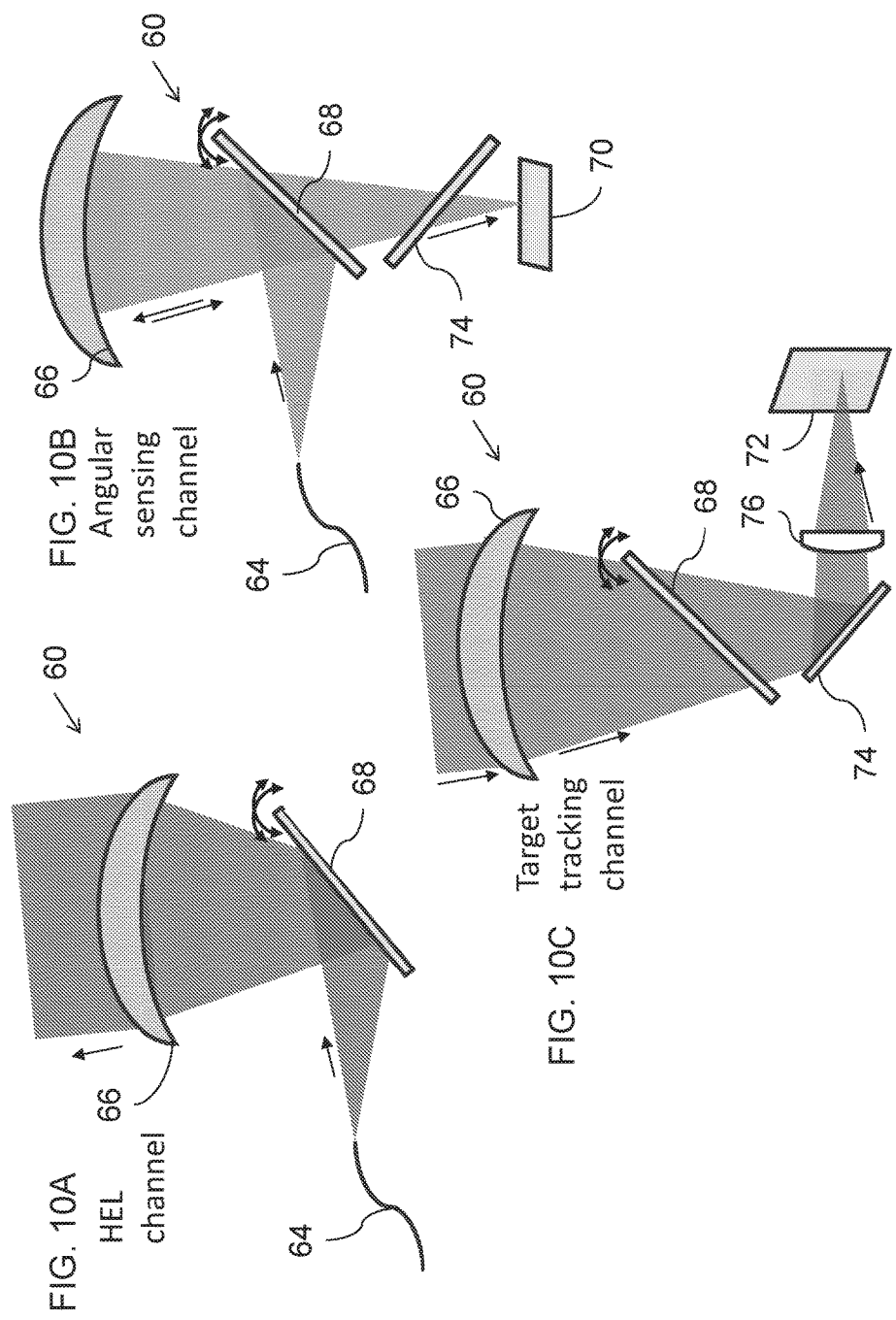

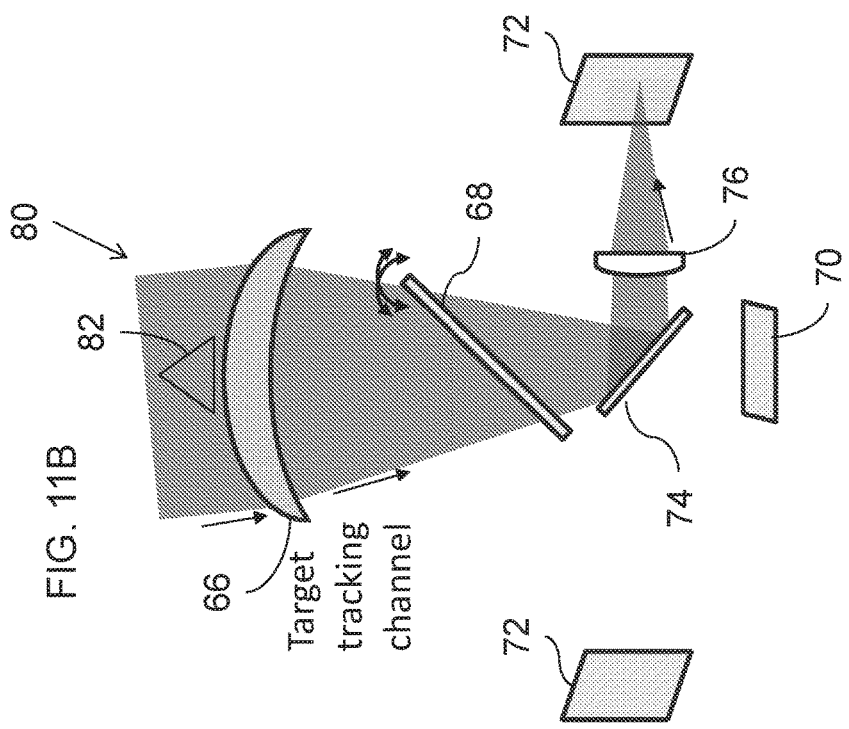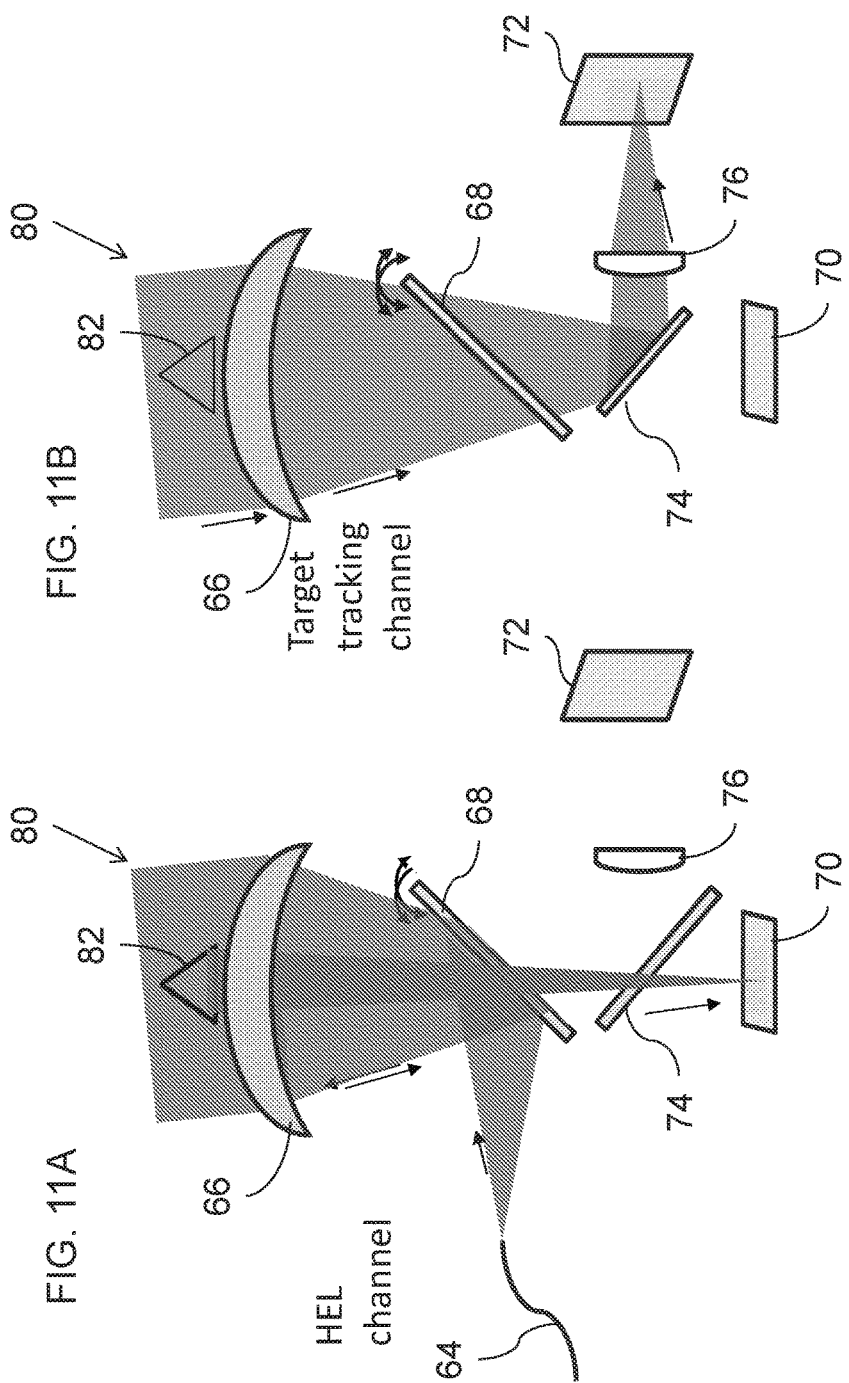

DIRECTED ENERGY WEAPON

FIELD AND BACKGROUND OF THE INVENTION

The present invention relates to directed energy weapons and, in particular, it concerns directed energy weapons based on fiber lasers.

It has been proposed to use high energy laser (HEL) radiation focused on a target as weapon, both in offensive and defensive roles. Various types of lasers suitable for generating high energy beams are problematic for practical implementations of a weapon due to their reliance on dangerous chemicals or requirements for bulky hardware.

Fiber lasers, i.e., lasers in which the active gain occurs within an optical fiber, are compact and avoid use of dangerous chemicals. Although output powers of more than 1 kW are available, output from a single fiber laser using current technology does not provide sufficient output power for implementation of an optimal directed energy weapon.

Various attempts have been made to combine multiple fiber lasers in a directed energy weapon so as to provide a desired total power output. Examples include: U.S. Pat. No. 7,970,040 and WO 2012/062399.

SUMMARY OF THE INVENTION

The present invention is a directed energy weapon based on fiber lasers.

According to the teachings of an embodiment of the present invention there is provided, a directed energy weapon for use against a target, the weapon comprising: (a) a plurality of laser units, each of the laser units comprising: (i) a fiber laser generating an output beam from a fiber, the output beam conveying power of at least 1 kW, (ii) an objective lens arrangement for focusing the output beam into a focused beam directed towards the target, and (iii) a fine adjustment mechanism for adjusting a direction of the focused beam; (b) for each of the laser units, a beam deflector arrangement deployed to deflect a portion of the focused beam as a deflected beam in a direction in predefined relation to a direction of the focused beam; (c) an angle sensing unit deployed for receiving the deflected beams and generating an output indicative of a current direction of the deflected beam for each of the laser units; and (d) a controller associated with the angle sensing unit and the fine adjustment mechanisms, the controller being configured to actuate the fine adjustment mechanisms based on the output from the angle sensing unit to maintain a desired relative alignment between the directions of the focused beams.

According to a further feature of an embodiment of the present invention, the beam deflector arrangement deflects no more than 1 percent of the energy of the focused beam.

According to a further feature of an embodiment of the present invention, the beam deflector arrangement includes at least one pentaprism for each of the laser units.

According to a further feature of an embodiment of the present invention, the plurality of laser units is implemented as a two dimensional array of the laser units including a plurality of rows of the laser units, and wherein the beam deflector arrangement includes at least one pentaprism for each of the laser units deployed to generate a set of once-deflected beams in generally parallel relation from the laser units in each of the rows, the set of once-deflected beams being spaced apart by less than a diameter of the objective lens arrangement, the beam deflector arrangement further comprising an additional pentaprism for each of the rows deployed to deflect the set of once-deflected beams to form an array of deflected beams from a plurality of the rows.

According to a further feature of an embodiment of the present invention, the fine adjustment mechanism comprises at least one actuator deployed for displacing a fiber tip of the fiber laser.

According to a further feature of an embodiment of the present invention, the fine adjustment mechanism comprises at least one actuator deployed for varying an angular position of a mirror.

According to a further feature of an embodiment of the present invention, there is also provided a focus adjustment mechanism including at least one actuator deployed for displacing a fiber tip of the fiber laser so as to vary a length of an optical path from the fiber tip to the objective lens arrangement.

According to a further feature of an embodiment of the present invention, there is also provided a set of shutters or modulators associated with the controller and deployed to control a quantity of light from each of the laser units to the angle sensing unit, wherein the controller is configured to operate the set of shutters or modulators to modulate the deflected beams so as to facilitate angle sensing for each individual one of the laser units.

According to a further feature of an embodiment of the present invention, the plurality of laser units is implemented as a two dimensional array of at least ten of the laser units.

According to a further feature of an embodiment of the present invention, there is also provided a tracking sensor deployed for tracking the target and evaluating alignment of the focused beams with the target, wherein the controller is further configured to actuate the fine adjustment mechanisms based on an output from the tracking sensor.

According to a further feature of an embodiment of the present invention, the tracking sensor is implemented as a directed energy weapon subsystem comprising: (a) a fiber laser generating an output beam from a fiber, the output beam conveying power of at least 1 kW; (b) an optical arrangement for focusing the output beam into a focused beam directed towards the target; (c) a fine adjustment mechanism associated with the optical arrangement and deployed to adjust a direction of the focused beam; and (d) a sensing arrangement deployed for: (i) sensing a part of the output beam reflected from an element of the optical arrangement so as to be indicative of a direction of propagation of the focused beam; and (ii) focal-plane sensing of radiation arriving at the optical arrangement from the target so as to allow tracking of the target.

There is also provided according to the teachings of an embodiment of the present invention, a directed energy weapon for use against a target, the weapon comprising: (a) a fiber laser generating an output beam from a fiber, the output beam conveying power of at least 1 kW; (b) an optical arrangement for focusing the output beam into a focused beam directed towards the target; (c) a fine adjustment mechanism associated with the optical arrangement and deployed to adjust a direction of the focused beam; and (d) a sensing arrangement deployed for: (i) sensing a part of the output beam reflected from an element of the optical arrangement so as to be indicative of a direction of propagation of the focused beam; and (ii) focal-plane sensing of radiation arriving at the optical arrangement from the target so as to allow tracking of the target.

According to a further feature of an embodiment of the present invention, the sensing arrangement comprises: (a) a first sensing system deployed for focal-plane sensing of the part of the output beam reflected from the element of the optical arrangement so as to be indicative of a direction of propagation of the focused beam; and (b) a second sensing system deployed for focal-plane sensing of radiation arriving at the optical arrangement from the target so as to allow tracking of the target.

According to a further feature of an embodiment of the present invention, the output beam includes a first wavelength component conveying power of at least 1 kW and a second wavelength component conveying a power at least two orders of magnitude smaller than the first wavelength component, and wherein at least one component of the optical arrangement is transparent to the first wavelength and is an at least partial reflector for the second wavelength, a reflected portion of the second wavelength component providing the part of the output beam sensed by the sensing arrangement.

According to a further feature of an embodiment of the present invention, the output beam has a given wavelength conveying at least a majority of the power, and wherein the part of the output beam reflected from the element shares the given wavelength.

According to a further feature of an embodiment of the present invention, the optical arrangement includes a corner reflector deployed for reflecting a part of the focused beam back through the optical arrangement.

According to a further feature of an embodiment of the present invention, the element of the optical arrangement reflecting part of the output beam is a surface of an objective lens of the optical arrangement.

According to a further feature of an embodiment of the present invention, the fine adjustment mechanism comprises at least one actuator deployed for displacing a fiber tip of the fiber laser.

According to a further feature of an embodiment of the present invention, the fine adjustment mechanism comprises at least one actuator deployed for varying an angular position of a mirror.

BRIEF DESCRIPTION OF THE DRAWINGS

The invention is herein described, by way of example only, with reference to the accompanying drawings, wherein:

FIG. 2 is a front view of the directed energy weapon of FIG. 1;

FIG. 3C is an enlarged schematic isometric view illustrating a secondary beam deflecting element for bringing deflected alignment beams from a row of laser units into closely spaced parallel relation;

FIG. 4 is a schematic front view illustrating the operation of the secondary beam deflecting element;

FIGS. 10A-10C are schematic illustrations of the optical paths followed in FIG. 9 by the high-energy laser radiation, an angular sensing radiation channel, and a target tracking channel, respectively; and FIGS. 11A and 11B are schematic diagrams of an alternative implementation of an integrated laser unit and fine alignment tracker according to an embodiment of the present invention, illustrating the optical paths followed by the high-energy laser radiation with a reflected alignment beam, and a tracking channel, respectively.

DESCRIPTION OF THE PREFERRED EMBODIMENTS

The present invention is a directed energy weapon based on fiber lasers.

The principles and operation of directed energy weapons according to the present invention may be better understood with reference to the drawings and the accompanying description.

By way of introduction, the present invention has a number of distinct aspects, each of which is believed to be worthy of patent protection in its own right, and which are believed to be of particular significance when employed together in synergy. Specifically, a first aspect of the present invention relates to a system and corresponding method for ensuring correct relative inter-beam alignment (IBA) between multiple beams from separate fiber laser units, each with its own objective optics. This inter-beam alignment facilitates reliable tracking of multiple fiber laser units on a common target while using a shared fine alignment tracker. A second aspect of the present invention relates to a compact autonomous tracking collimator (CATC) which integrates a fiber laser unit with a fine tracking sensor and beam alignment verification in a compact combined unit employing a single optical aperture. A particularly preferred implementation of the present invention optionally combining both of the above aspects will be presented herein with reference to FIGS. 1 and 2. Preferred features and implementations of the IBA aspect of the invention will then be detailed with reference to FIGS. 3A-7. A dedicated fine alignment tracker that could be used with an array of laser units according to the first aspect of the invention is illustrated schematically in FIG. 8. Then, with reference to FIGS. 9-11B, various implementations of the CATC aspect of the invention will be described.

Figure 1:
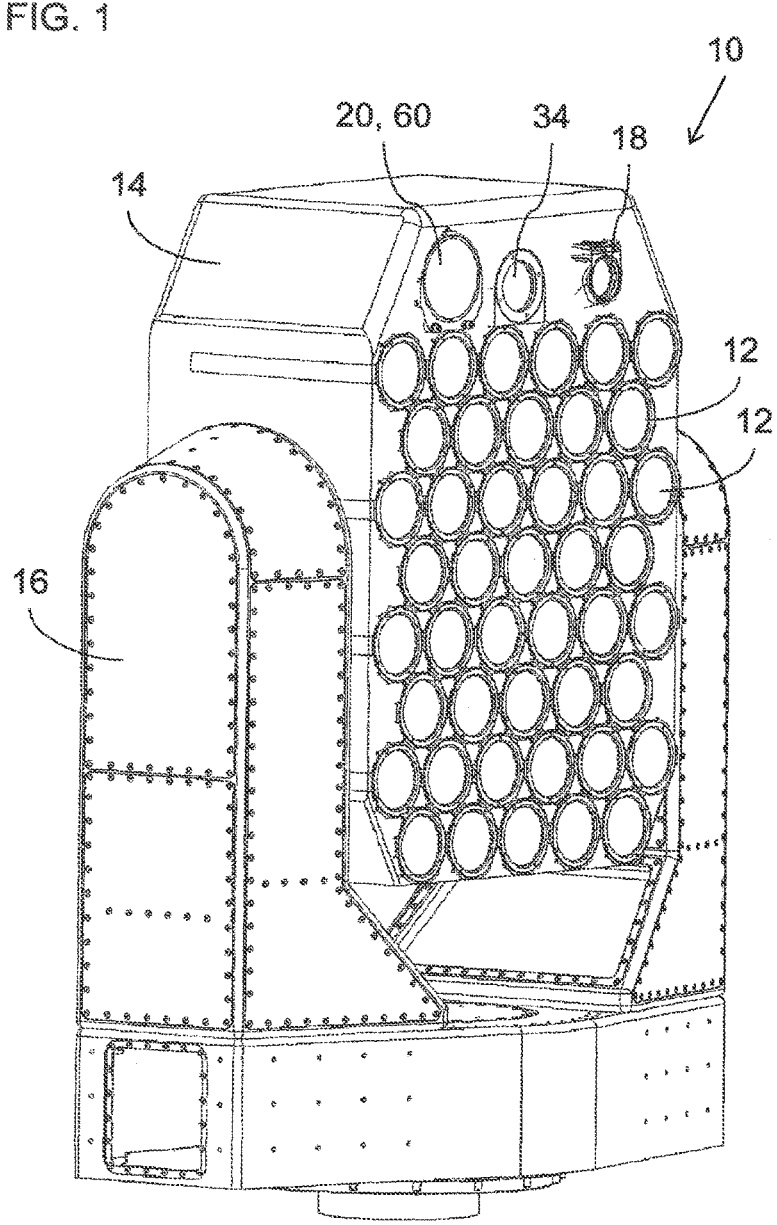
FIG. 1 is an isometric view of a directed energy weapon, constructed and operative according to an embodiment of the present invention, showing a two dimensional array of laser units in a gimbaled housing.

Referring now to the drawings, FIGS. 1 and 2 illustrate a directed energy weapon, generally designated 10, constructed and operative according to an embodiment of the present invention, employing a plurality of fiber laser units 12 arranged in an array within a housing 14 which is mounted on a gimbal mount 16 providing elevation-over-azimuth coarse direction control. Also integrated into housing 14 are a coarse tracking imaging sensor 18, such as a FUR, a fine tracking sensor 20, which may optionally be integrated as part of a CATC unit 60 according to the second aspect of the present invention, and an angular sensing unit 34, the function of which will be described below.

Each laser unit 12 has a fiber laser 24, typically mounted remotely from housing 14, for example in the base of gimbal mount 16, generating an output beam from a fiber 26 (FIG. 7) which conveys an output power of at least 1 kW, and more preferably at least about 10 kW. An objective lens arrangement 28 is configured for focusing the output beam into a focused, beam directed towards a target. It should be noted that the term "focused beam" as used here includes the possibility of a parallel collimated beam, which is effectively focused at "infinity" for distant targets. Each laser unit 12 also includes a fine adjustment mechanism for adjusting a direction of the focused beam. In the implementation illustrated schematically in FIG. 7, the fine adjustment mechanism is implemented as a fiber tip displacement mechanism 30, providing fine adjustment of the tip of fiber 26 in at least the two dimensions perpendicular to the optic axis of laser unit 12. Other implementations of a fine adjustment mechanism, such as using a fast steering mirror, can also be used.

It is a particular feature of certain embodiments of the present invention that directed energy weapon 10 includes an arrangement for inter-beam alignment to facilitate correct relative alignment of the beams from laser units 12. To this end, each laser unit 12 has a beam deflector (or "beam sampler") arrangement deployed to deflect a portion of the focused beam as a deflected beam in a direction in predefined relation to a direction of the focused beam. In the example illustrated in FIGS. 3A-7, the beam deflector arrangement includes a pentaprism 32 associated with each objective lens arrangement 28, either attached thereto or spaces in front of the objective lens arrangement, which generates a once-deflected beam perpendicular to the focused beam emerging from the objective lens.

An angle sensing unit (ASU) 34 is deployed for receiving the deflected beams, optionally after one or more further deflection (as will be exemplified below), and generates an output indicative of a current direction of the deflected beam for each of the laser units. This indication is then processed by a controller 36 to determine a required alignment correction for the corresponding laser units. Controller 36 generates outputs to actuate the fine adjustment mechanism for each laser unit to maintain a desired relative alignment between the directions of the focused beams.

At this stage, it will already be clear that the inter-beam alignment aspect of the present invention provides highly advantageous solution for achieving high power density on a target using multiple fiber lasers. Specifically, the use of a plurality of separate laser units with their own optical apertures avoids the complexity and scalability-limitations of systems that attempt to combine multiple fiber laser outputs into a combined beam from a single optical aperture. At the same time, by providing reliable inter-beam alignment between the outputs of multiple laser units, it becomes possible to employ a common fine-tracking system for maintaining precise alignment of the group of beams on a target, thereby rendering the system highly compact and cost effective. These and other advantages of this aspect of the present invention will become clearer from the following description.

It will be helpful to define certain terminology as used herein in the description and claims. Firstly, the term "directed energy weapon" as used herein refers to any weapon, for defensive and/or offensive applications, in which electromagnetic radiation is directed towards a target to deliver sufficient power as to cause damage to the target. In quantitative terms, the delivered power is typically in excess of 50 kW, and more preferably at least 100 kW. The present invention relates particularly to directed energy weapons employing optical wavelengths of electromagnetic radiation, defined herein as encompassing short-wave infrared (SWIR), near infrared (NIR), visible and ultraviolet wavelengths. The invention is typically implemented in the SWIR or NIR ranges of the spectrum, where suitable high power lasers are currently commercially available.

The term "fiber laser" is used to refer to any laser in which the stimulated emission effect occurs within an optical fiber. For directed energy weapon applications, high power lasers should be used. A range of high energy fiber lasers with output powers in excess of 1 kW, and in some cases from 10 kW upwards, are commercially available.

The term "objective lens" is used herein to refer to the outermost optical component from which an outgoing beam is issued (not including a beam deflector), or the first optical component encountered by incoming radiation for imaging or sensing functions. The objective lens typically also defines an optical aperture of the corresponding optical arrangement.

Where reference is made to a "controller", "processor" or "processing system" performing various different functions, the intention is typically to refer to a processing system including one or more processors configured, by hardware, software or any combination thereof, and by addition of any required interfaces or the like, to perform the recited functions. As is well known, multiple functions performed by a processing system may be performed by a single processing system, or may be distributed between multiple processing systems which may be physically separate and even remote from one another. All such arrangements fall within the intended scope of the terms "controller", "processor" and "processing system", whether used in the singular or in the plural. Furthermore, as will be clear to a person ordinarily skilled in the art, various common functions attributed herein to sensors and/or controllers are in fact performed by extensive multi-stage processing. One such example is a "target tracking" function performed on output of an image sensor, which typically involves multiple processes such as image pre-processing, feature identification and/or classification, and application of various frame-to-frame tracking algorithms. Such processes and the corresponding required processing hardware/software are all well known in the art, and will not be described herein in detail.

Turning now to the features of directed energy weapon 10 in more detail, as mentioned above, each laser unit 12 is fed by a fiber laser 25 which delivers an output beam from a fiber 26. The output from fiber 26 typically emerges via a suitable fiber terminator or "end cap", which achieves some initial spreading of the beam. The fiber laser feeds into the optical arrangement of the laser unit, which includes objective lens arrangement 28 and optionally other optical components. The optical arrangement achieves broadening of the beam and collimation to form a final beam which is referred to as a "focused beam" directed towards a target. It will be noted that typical ranges for use of the directed energy weapon of the present invention are typically from hundreds of meters up to several kilometers, such that the focused beam has a very small convergence, and for longer ranges is effectively a collimated parallel beam.

Each laser unit 12 has its own fine adjustment mechanism for adjusting a direction of the focused beam. The option illustrated in FIG. 7 employs a fiber tip displacement mechanism 30, which can conveniently be implemented using a piezo-electric actuator deployed to displace the fiber tip (or fiber terminator) in two dimensions perpendicular to the optical axis of the laser unit. Since coarse alignment is controlled by gimbal mount 16, the range of fine adjustment required is typically small, and linear displacements of less than a millimeter, or at most a few millimeters, in each direction are typically sufficient.

It should be noted that the fiber tip displacement mechanism is only one of a number of possible fine adjustment mechanisms which may be used to implement laser units 12. As a further non-limiting example, a fine adjustment mechanism may be implemented with a beam reflected from a fast steering mirror (FSM) which provides fine angular adjustment of the beam direction. Fast steering mirrors, typically employing at least one actuator such as a piezo electric actuator for varying an angular position of a mirror, are well known in the art and are readily commercially available. The term "fast steering mirror" is used herein to refer to the entire assembly of a mirror with a set of actuators, details of which will not be illustrated or described.

According to various particularly preferred implementations, the laser units 12 also include a focal length adjustment mechanism, typically implemented by employing at least one actuator deployed for displacing the tip of fiber 26 in a direction parallel to an optical axis of the laser unit so as to vary a length of an optical path from the fiber tip to the objective lens arrangement. This motion is used to vary an effective focal distance of the system to correspond to the estimated distance to the current target. In the case of a fiber displacement adjustment mechanism, the focal adjustment may optionally be integrated with the alignment adjustment. Alternatively, in view of the fact that required response times for the focal length adjustment are relatively slow, simpler or lower cost adjustment actuators may be used. One non-limiting example is use of a linear stage operated by a stepper motor.

Turning now to the beam deflector arrangement, while the underlying principles of this aspect of the present invention may be implemented using a wide range of beam deflector arrangements, certain particularly preferred implementations take advantage of the properties of a pentaprism which achieves precise deflection of the sampled beam through 90 degrees while being insensitive to, and independent of, the alignment of the pentaprism. The design of pentaprisms and their properties are well known in the art of optics, and a range of pentaprisms suitable for use in the present invention are commercially available.

As illustrated from various different views in FIGS. 3A-6, each laser unit 12 is provided with a small pentaprism 32 deployed for deflecting a small proportion of the outgoing focused beam through 90°. The pentaprism preferably deflects no more than 1 percent of the energy of the focused beam, and typically much less. The deflected intensity is determined primarily by the dimensions of the pentaprism, which is preferably small compared to the optical aperture.

Figure 3A:
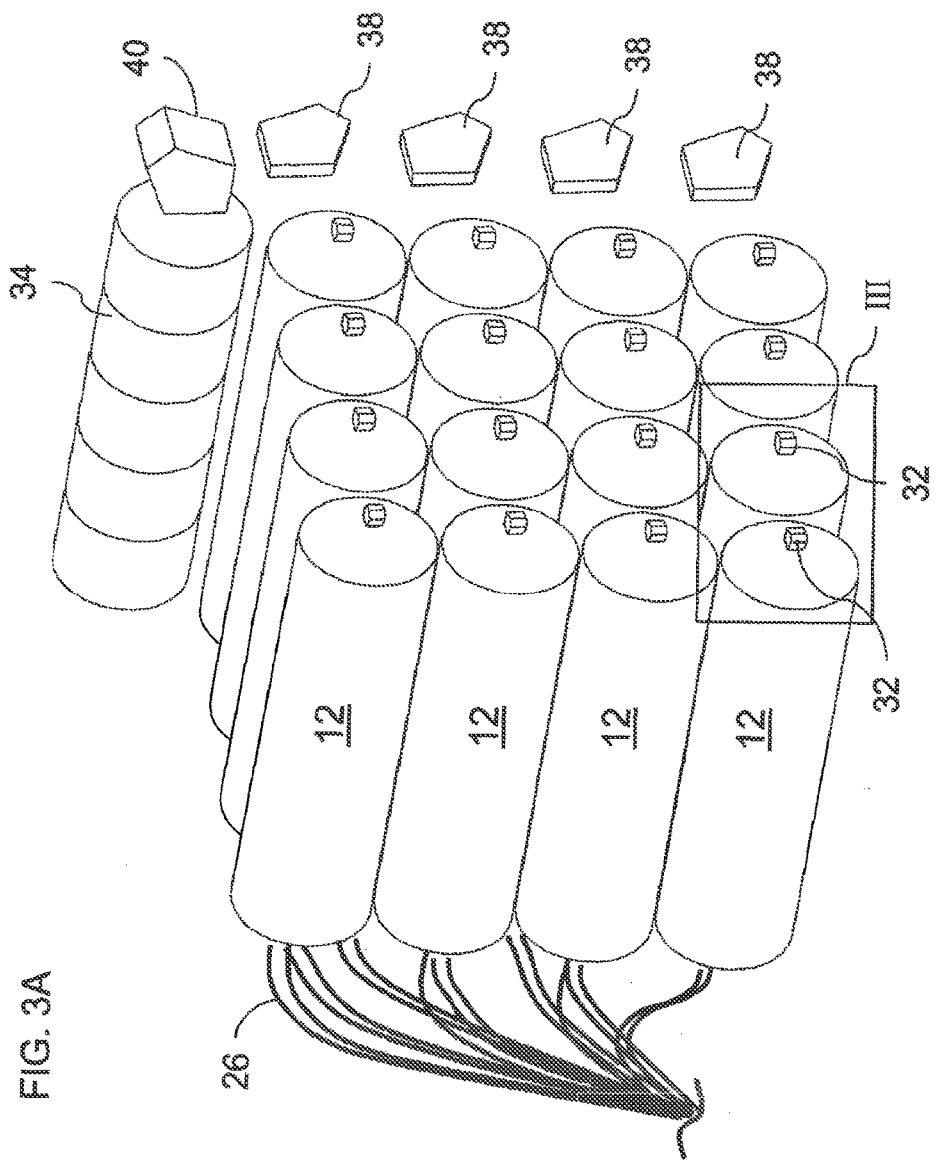
FIG. 3A is a schematic isometric view of a beam deflector arrangement forming part of an inter-beam alignment system for use in the directed energy weapon of FIG. 1.
Figure 3B:
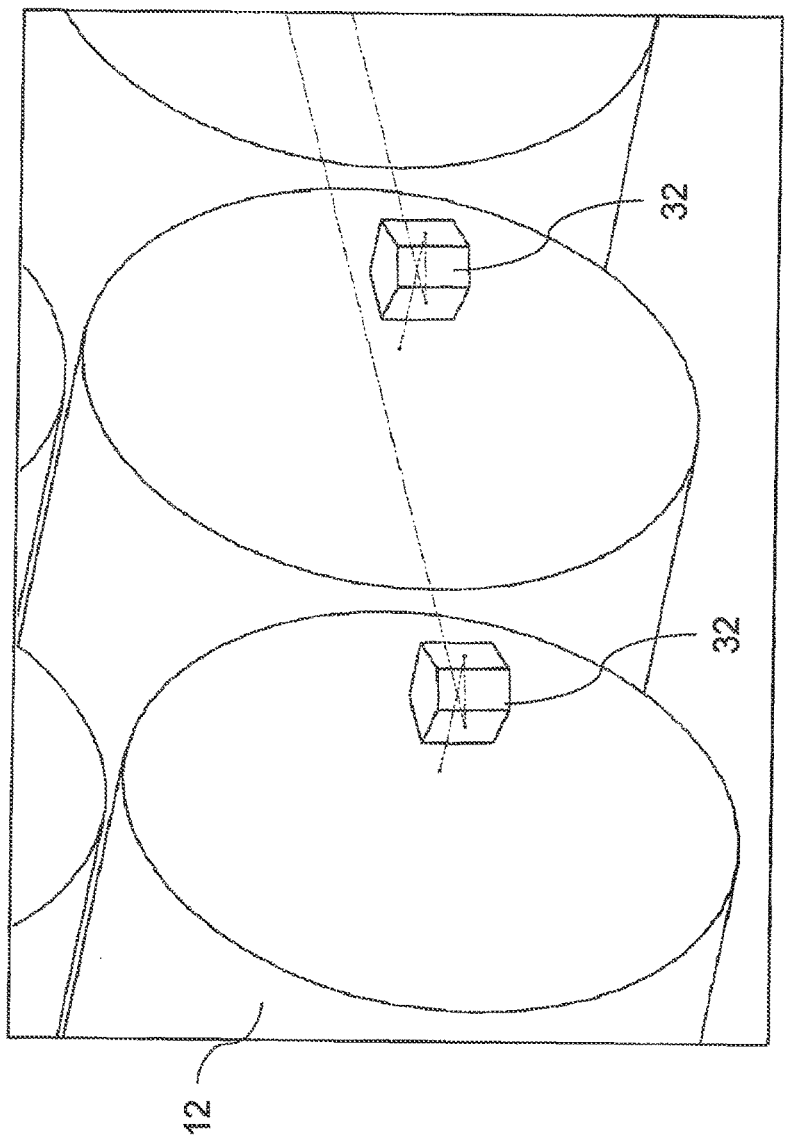
FIG. 3B is an enlarged view of a region of FIG. 3A designated III, illustrating alignment beam deflecting elements associated with individual laser units.

In order to facilitate the use of a single angle sensing unit 34 for measuring the alignment of multiple laser unit beam directions, the present invention preferably deploys staggered arrays of pentaprisms to deflect beams from a row of laser units into a set of once-deflected beams in generally parallel relation. This is best illustrated in FIGS. 3B and 4. The example of a two-dimensional array illustrated here thus generates, for each row, a set of horizontal once-deflected beams which are in a closely spaced vertical row. This set of beams is preferably spaced apart by less than a diameter of the objective lens arrangement of the laser units, and typically arranged in a close-packed bundle of rays with inter-beam spacing of less than 1 cm.

A preferred beam deflection arrangement as illustrated includes an additional pentaprism 38 for each of the rows deployed to deflect the set of once-deflected beams to form an array of deflected beams from a plurality of the rows.

Figure 5:
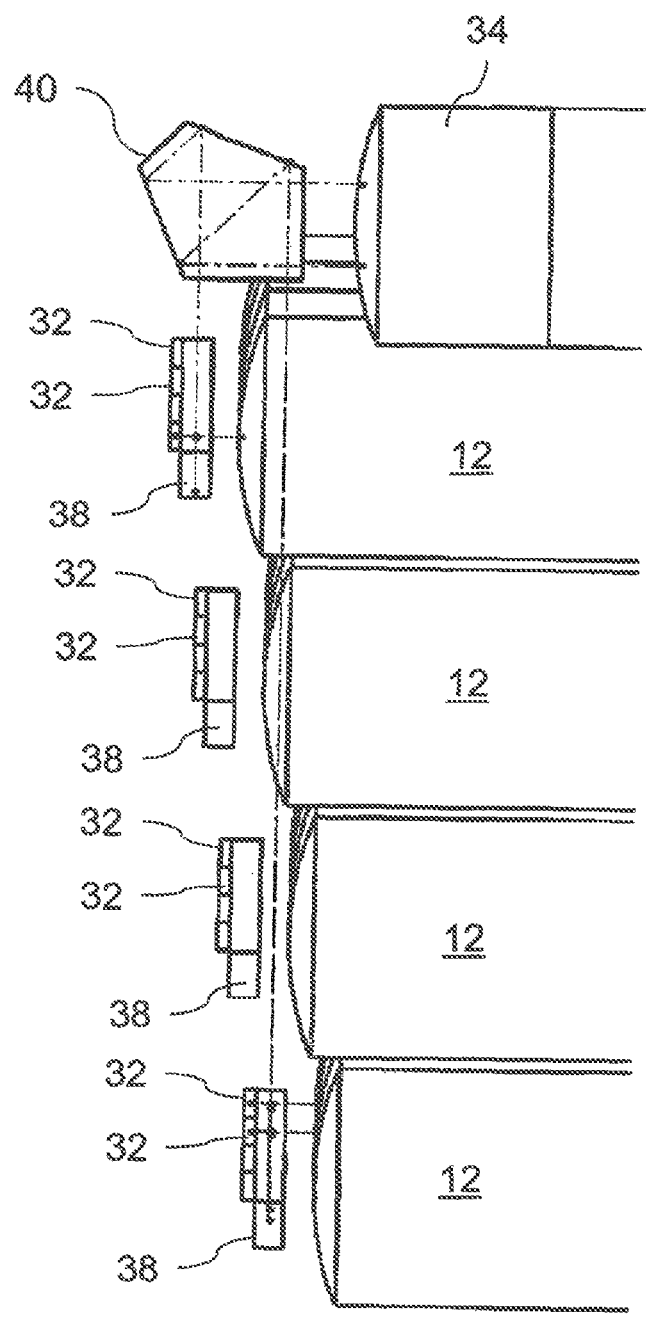
FIG. 5 is a schematic side view illustrating the operation of a plurality of staggered secondary beam deflecting elements to bring alignment beams from a plurality of rows into closely spaced parallel relation.
Figure 6:
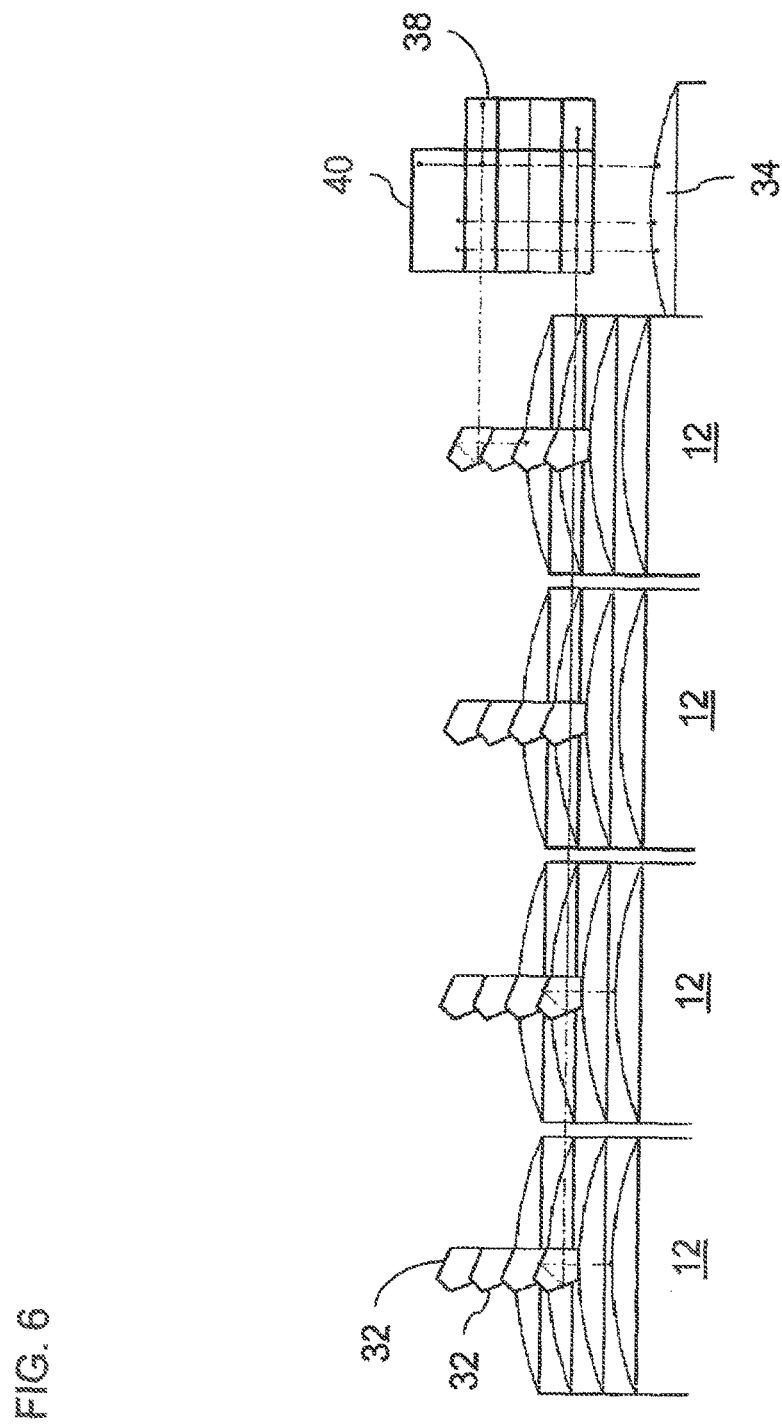
FIG. 6 is a schematic top view illustrating a further deflection of a two-dimensional closely spaced array of parallel alignment beams from the two-dimensional array of laser units into an angle sensing unit.

The specific exemplary arrangement of additional pentaprisms 38 as presented here is best understood from the view of FIG. 5 shows staggering of successive rows of laser units so that each additional pentaprism 38 deflects its group of beams from its corresponding row upwards in a plane parallel to those of the other rows. The overall result is to generate a two-dimensional array of parallel beams in closely spaced relation corresponding to the two dimensional array of laser units, but all aligned within a cross-section sufficiently small to be delivered to a single angle sensing unit. Although the angle sensing unit 34 could be aligned in a vertical direction to directly receive the set of beams, the preferred implementation illustrated here includes a single large pentaprism 40 deployed to perform a third deflection, directing all of the beams into angle sensing unit 34 that lies in the plane of the other optical apertures.

Angle sensing unit 34 may be implemented as a conventional sensing unit for determining direction of incidence of laser beams of the appropriate wavelength. The lateral offsets between the incoming beams are typically not significant, since the device detects the incident angle of the beam but is insensitive to lateral offsets. Specifically, the incoming beams are typically focused onto an array of sensors and the position of the beam falling on the focal plane indicates the direction of incidence.

In order to employ a single angle sensing unit for measuring alignment of multiple beams, an arrangement must be made to enable the ASU to either distinguish between the different beams or to receive the beams during different time slots. A simplest implementation employs a shutter 42 (FIG. 7) associated with each laser unit 12 and deployed to selectively block or allow transmission of the beam deflected from the corresponding pentaprism 32. According to this approach, controller 36 preferably actuates shutters 42 so as to sequentially open one shutter at a time and to retrieve from ASU 34 the angle measurement for the beam from the corresponding laser unit 12. Other options include, but are not limited to, adding a distinctive frequency or time-varying signal as a modulation to the deflected beam, and employing selective detection techniques to allow the ASU to lock onto a given beam even in the presence of other incident beams. Such modulation may be introduced by shutters 42 operating as modulators.

The output of ASU 34 for each laser unit 12 is typically an angular offset from a default "correct" direction for that laser unit. It should be noted that the "correct" directions are not necessarily exactly parallel, since the focused beams are intended to combine at the target onto a small region of the target. Furthermore, slight misalignments of elements in the beam deflecting arrangement may lead to the "correct" beam alignment being slightly away from the expected beam alignment measurement. All such factors are preferably taken into consideration during an initial calibration process performed after manufacture, and optionally repeated periodically, which defines the ASU output direction for each laser unit which corresponds to the corresponding laser unit's "correct" default beam direction. The real time ASU outputs are then indicative of any unintended deviation from the default direction, as well as measuring any currently applied fine steering correction.

Figure 7:
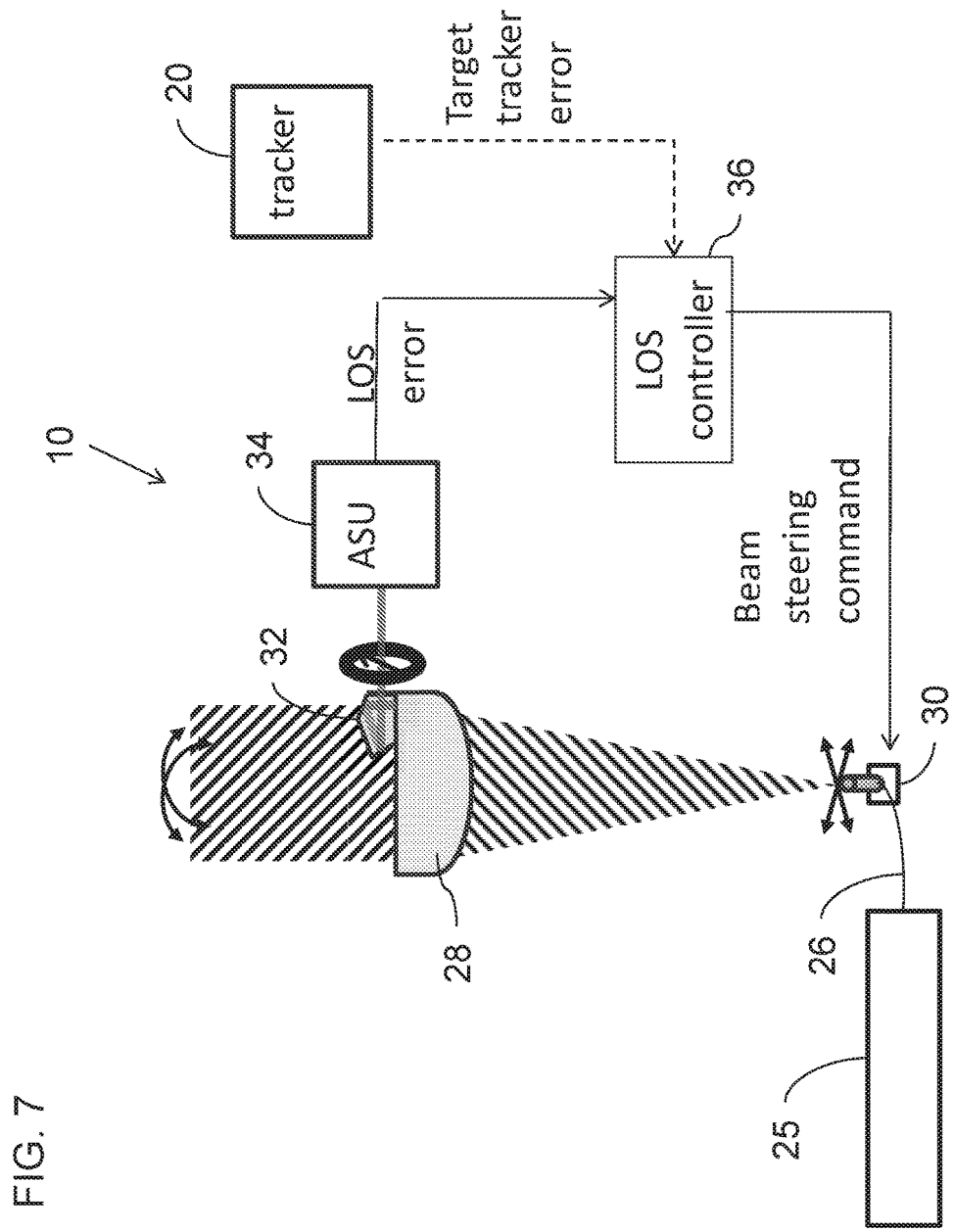
FIG. 7 is a schematic diagram illustrating the interrelation of each laser unit from the directed energy weapon of FIG. 1 with components of a control system for fine adjustment of beam alignment.

Referring to FIG. 7, this shows schematically closure of the control loop for maintaining correct alignment and fine steering of the focused beam from each laser unit. The line-of-sight (LOS) deviation measured by the ASU 34 is provided to controller 36 which generates a beam steering correction command which is delivered to the fine adjustment mechanism (e.g., fiber displacement mechanism 30) to achieve the correction. In calculating the beam steering correction, controller 36 also employs input from a fine tracking sensor (details of which will be discussed further below) which indicates any fine tracking correction which is required to the overall beam direction of the directed energy weapon to optimize its position on the target. As mentioned above, since inter-beam alignment is maintained between the different beams, the entire weapon can operate under the control of a single shared fine tracking sensor.

As will now be clear, the approach of this aspect of the present invention allows compact juxtaposition of a relatively large number of laser units in a one-dimensional or more preferably two-dimensional array. In many typical implementations, the combination of at least ten laser units 12 into a single weapon using inter-beam alignment is envisaged.

Figure 8:
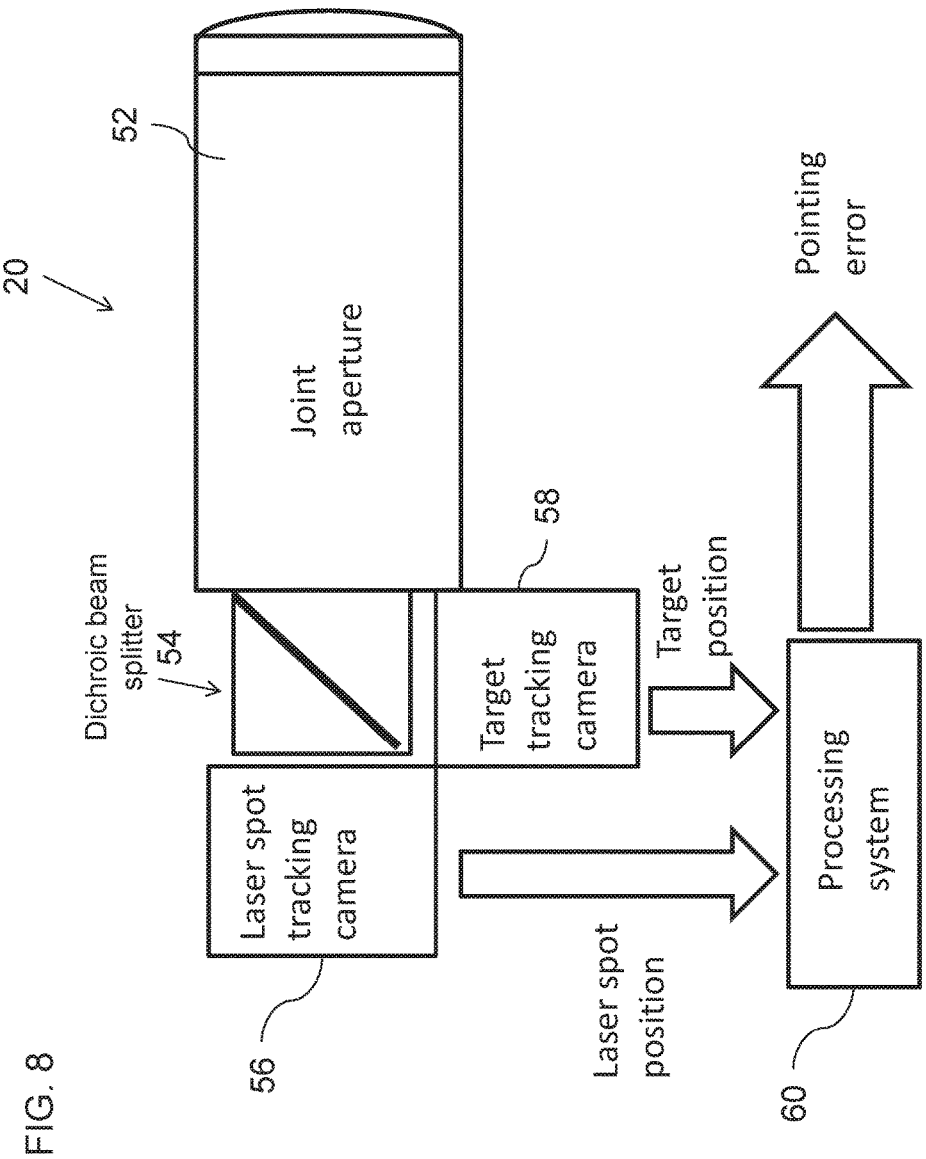
FIG. 8 is a schematic diagram of a fine alignment tracker for use as part of the directed energy weapon of FIG. 1 according to a first implementation.

Turning briefly to FIG. 8, this illustrates a simple implementation of fine tracking sensor 20, which may be employed to provide fine tracking information for correcting the LOS of directed energy weapon 10. Tracking sensor 20 employs a shared optic aperture/objective 52 to collect radiation from the target, which includes both radiation for imaging of the target and a reflection of the laser output reflected from the surface of the target. A dichroic mirror 54 separates the wavelength(s) of the laser(s) directed towards the target from the wavelengths used for imaging the target, directing the former onto a laser spot tracking camera 56 or other sensor suitable for tracking a laser spot, and the latter onto a target tracking camera 58. The target tracking may be performed at a wide range of wavelengths and using a wide range of imaging techniques including, but not limited to, NIR imaging, SWIR imaging, visible light imaging and thermal infrared imaging, with a preference for NIR or SWIR imaging. The outputs from cameras 56 and 58 are then processed by a processing system 60 (which may optionally be integrated with controller 36 mentioned above) to derive the laser spot position and the target position within the field of view. The "laser spot" referred to here is the sum total or average spot reflected by the target from all of the outgoing radiation. These positions are then correlated to derive a pointing error, for use in a fine tracking correction as described above.

Operation of directed energy weapon 10 will now be clearly understood. Gimbal mount 16 operating under control of controller 36 based on input from coarse tracking image sensor 18 aligns housing 14 facing towards a designated target, typically maintaining this alignment to a sufficient accuracy to allow fine alignment correction within the range of adjustment of the fine adjustment mechanism, and typically to an accuracy of significantly better than one degree. The fiber lasers are actuated to generate a set of focused beams all converging on the target. During operation of the fiber lasers, the beam exiting each laser unit 12 is sampled via the beam deflection arrangement which directs the beam to ASU 42, and any line-of-sight correction required in order to maintain inter-beam alignment with the other laser units is implemented by fine adjustment mechanism of each laser unit. In parallel with this process, fine tracking sensor 20 assesses the precision of the combined beam alignment with the target, and provides fine alignment correction inputs to controller 36 which are implemented together with the inter-beam alignment correction.

Turning now to the remaining FIGS. 9-11B, there is illustrated a further aspect of the present invention relating to a self-contained directed energy weapon, generally designated 60, for use against a target, which combines directed energy output, target tracking and beam alignment verification via a common optical aperture.

In general terms, directed energy weapon 60 includes a fiber laser 62 generating an output beam from a fiber 64 that conveys a power of at least 1 kW, and more preferably at least 10 kW. An optical arrangement 66 focuses the output beam into a focused beam directed towards the target. Weapon 60 also includes a fine adjustment mechanism, here exemplified by a fast steering mirror 68, associated with optical arrangement 66 and deployed to adjust a direction of the focused beam.

Directed energy weapon 60 further includes a sensing arrangement deployed for:
a) sensing a part of the output beam reflected from an element of optical arrangement 66 so as to be indicative of a direction of propagation of the focused beam; and
b) focal-plane sensing of incoming radiation arriving via optical arrangement 66 from the target so as to allow tracking of the target.

These two sensing functions are typically performed, respectively, by a first sensing system 70 deployed for focal-plane sensing of the part of the output beam reflected from the aforementioned element of optical arrangement 66, and a second sensing system 72 deployed for focal-plane sensing of incoming radiation arriving via the optical arrangement from the target. It should be noted however that, in certain alternative configurations (not shown), sensing of both the target image and the reflected outgoing beam may be possible using a single focal-plane sensor. In such cases, sensing of the laser beam reflection may be differentiated from the target image by introducing a time-varying amplitude modulation to the corresponding component of the outgoing beam, thereby allowing selective detection of the image component derived from the laser according to the time variation profile. In this case, a focal plane array sensor which can discriminate time varying signals should be used. An example of a suitable FPA sensor is commercially available from Shilat Optronics Ltd. (Rehovot, Israel).

Figure 9:
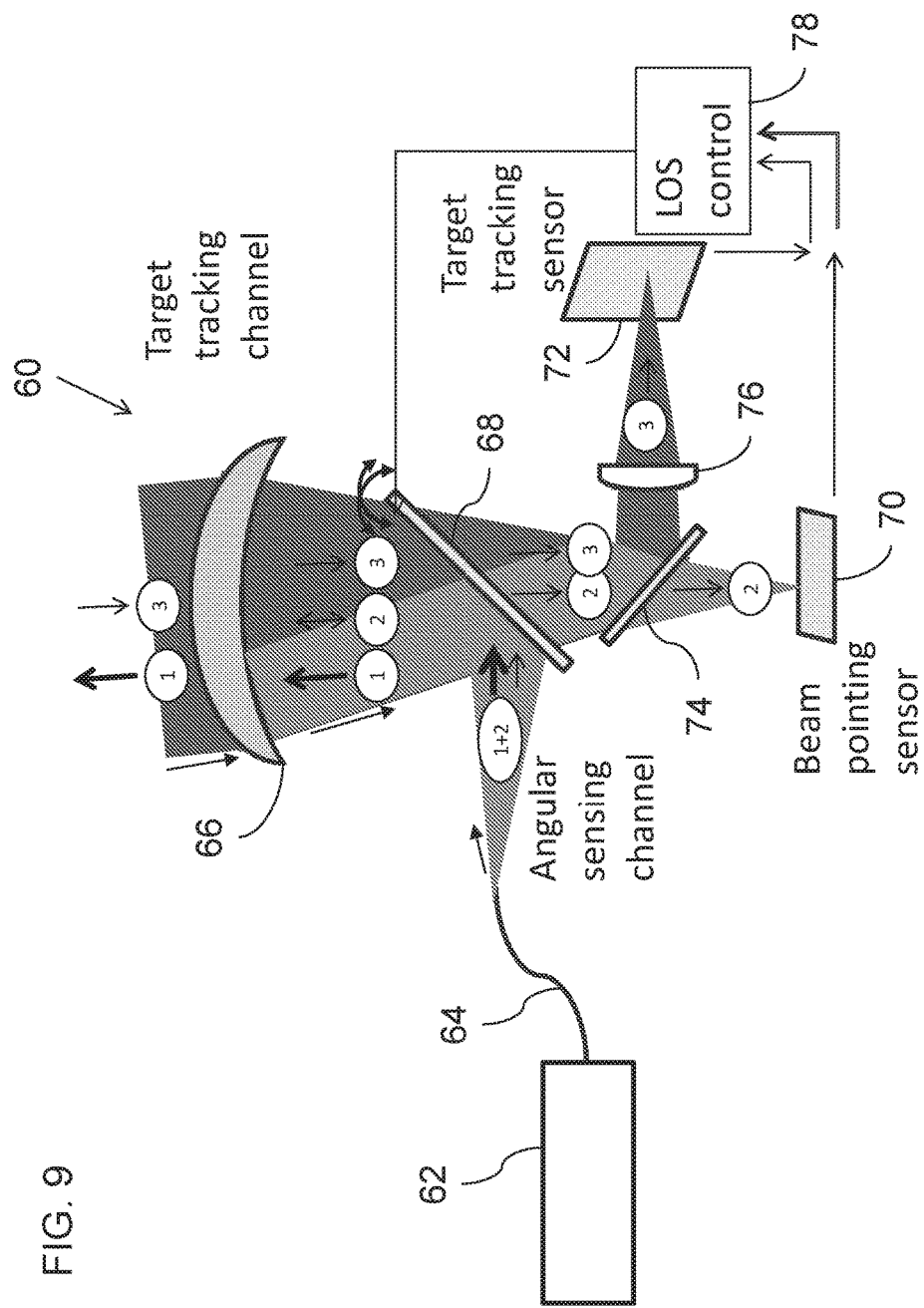
FIG. 9 is a schematic diagram of an integrated laser unit and fine alignment tracker according to a further aspect of the present invention, also for use as part of the directed energy weapon of FIG. 1 according to an alternative implementation.

A first preferred but non-limiting exemplary implementation of the above principles of operation is illustrated in FIGS. 9 and 10A-10C. FIG. 9 shows a combined view of the various different optical paths, while FIGS. 10A-10C are views of the same device but showing separately the optical paths for different wavelengths, and showing only those components which are relevant to each optical path, as will now be detailed.

In this case, the output from optical fiber 64 includes a first wavelength component, designated (1) in FIG. 9 and illustrated in FIG. 10A, which is the high-energy laser (HEL) component, conveying power of at least 1 kW. This is combined within the same fiber 64 with a second wavelength component, designated (2), that conveys a power at least two orders of magnitude smaller than the first wavelength component. The two components are at distinct wavelengths, typically originating from separate fiber lasers, and are coupled into a single fiber by conventional fiber coupling arrangements. Alternatively, in certain cases, the HEL itself may be configured by use of dichroic mirrors to simultaneously generate guide beam of a different wavelength within a single fiber. In order to selectively generate the reflected beam for alignment purposes from the second wavelength component, at least one component of the optical arrangement is configured by suitable use of layered coatings to be transparent (i.e., transmitting at least 98%, and preferably over 99%, of the incident radiation intensity) to the first wavelength while being an at least partial reflector (i.e., reflecting at least 5%, and preferably at least 10%, of the incident radiation intensity) to the second wavelength. This, with a suitable choice of wavelength filters on the sensors, ensures a sufficient intensity of the reflected portion of the second wavelength component providing the part of the output beam sensed by the sensing arrangement. In one particularly preferred but non-limiting implementation of the present invention as illustrated, the coatings to achieve at least partial reflection of the second wavelength are applied to a rear surface of the objective lens, with the surface being shaped to focus the reflected component (2) towards first sensing system 70.

According to this implementation, fine alignment correction of the HEL beam (1) is achieved by adjusting an angle of fast steering mirror 68, which is configured to be highly reflective to the first wavelength so as to direct substantially all of the HEL beam outwards towards the target. The HEL optical path is illustrated separately in FIG. 10A. In this implementation, fast steering mirror 68 is preferably also configured to have significant reflectivity (at least 10%) and significant transmission (at least 10%) for the second wavelength, thereby allowing a proportion of second wavelength component (2) to follow a path from fiber 64 through a reflection at fast steering mirror 68, reflection at the rear surface of an objective lens of optical arrangement 66, transmission through fast steering mirror 68 and transmission through a dichroic beam splitter 74 to reach sensor 70. The second wavelength optical path is illustrated separately in FIG. 10B. Most preferably, fast steering mirror 58 has a transmittance in the range of 50% (+/−20%) transmission of the second wavelength, thereby ensuring that the signal following the above optical path arrives with sufficient intensity to facilitate measurement at sensor 70, despite the proportions of the beam lost at each reflection/transmission. The design of the fast steering mirror is chosen such that the positioning of the actuators does not obstruct a transmitted beam in the direction towards sensor 70.

In addition to the paths followed by the first and second wavelength components (1) and (2), directed energy weapon 60 additionally serves as an imaging device for incoming radiation (3) arriving via optical arrangement 66 from the target for the purpose of tracking the target. The range of wavelengths employed for target tracking preferably excludes the first and second wavelengths, and may be any suitable range of wavelengths with a corresponding choice of sensor 72, including but not limited to, visible light, NIR or SWIR wavelengths of one or more range, for example, for image sensing via a CCD or CMOS image sensor. In the implementation illustrated here, dichroic mirror 74 is configured to reflect a majority of the radiation at the wavelengths used for imaging, while a majority of radiation of the second wavelength passes through, although a reversed layout could clearly be implemented. Optionally, additional optical components such as a lens 76 complete the target tracking imaging optical arrangement for forming an image at sensor 72. The overall optical path of the target tracking channel is illustrated in FIG. 20C.

Directed energy weapon 60 has been described here implemented with a fast steering mirror 68 as the fine adjustment mechanism for adjusting the direction of the HEL beam. It should be appreciated however that an alternative fine adjustment mechanism employing one or more actuators for displacing the tip of fiber 64 in at least two dimensions (as illustrated above in FIG. 7) may also be used here.

At this point, the operation of directed energy weapon 60 will be understood. Since the first and second wavelength components emerge from the same fiber 64 and are reflected at the same fast steering mirror 68, the second wavelength component necessarily follows exactly the same direction as the outgoing HEL channel, such that the resulting position of the sensed dot on sensor 70 is a reliable indication of the HEL beam direction. In parallel, the same objective optics is used in deriving a target image at sensor 72. By performing an initial production calibration for the device (optionally repeated intermittently), a known mapping of the sensed beam direction to pixels of the tracking sensor can be determined, thereby allowing subsequent verification of the alignment of the beam with a tracked target. Fast steering mirror 68 is then operated under closed loop control by a line-of-sight controller 78 to maintain the outgoing beam direction aligned with the tracked target.

Given the highly compact design of directed energy weapon 60 in using a common aperture for both HEL transmission and target tracking, a number of such directed energy weapons may be combined, for example by mounting in a common gimbaled housing, to form a directed energy weapon of substantially any desired power output. Alternatively, as in the preferred embodiment of FIGS. 1 and 2, fine tracking sensor 20 may be implemented as directed energy weapon 60 so as to simultaneously provide the required fine tracking functionality and to contribute to the transmitted HEL output. In this case, the output beam of directed energy weapon 60 is preferably sampled by a pentaprism of the inter-beam alignment system in order to ensure correct alignment between the outgoing beams of the two subsystems.

Turning finally to FIGS. 11A and 11B, there is shown an alternative implementation of a directed energy weapon according to the second aspect of the invention, generally designated 80. Directed energy weapon 80 is generally similar to directed energy weapon 60, and equivalent elements are similarly labeled. In this case, instead of adding a second distinct wavelength to the beam from fiber 64, a small proportion of the primary HEL beam is reflected in order to provide a sample for detecting outgoing beam alignment.

In the preferred implementation illustrated here, a small portion of the outgoing focused beam beyond the objective optics of optical arrangement 66 is reflected by a small corner reflector 82. Corner reflectors, formed by three mutually perpendicular mirrors meeting at a corner, are well knows in optics, and have the property of reflecting incident radiation back along a path parallel to its incident path. The reflected portion of the beam, which is less than 1% of the focused beam intensity (and more typically a small proportion of a percent), passes back through optical arrangement 66 and impinges on fast steering mirror 68. Although FSM 68 is configured to reflect as high a proportion of the HEL beam as possible, a small proportion, typically in the region of 0.2%, "leaks" through the mirror. In this implementation, that small leakage beam derived from the small reflected beam is still sufficient to allow sensing of the beam direction using sensor 70. The HEL beam paths are illustrated in FIG. 11A. As an alternative implementation of this concept, instead of a corner reflector, the objective lens system can be designed such that the very small proportion of the HEL beam reflected off the rear surface (or some other surface) of the objective lens is directed towards sensor 70 in a manner analogous to the geometry of the FIG. 9 beam alignment optical path.

FIG. 11B shows the target tracking channel, which is fully equivalent to that of directed energy weapon 60 as described above with reference to FIG. 10C. Other details, such as the control system, as well as the overall function of the device, are also equivalent to that described above with reference to directed energy weapon 60, and for conciseness of presentation, are not described again here.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

It will be appreciated that the above descriptions are intended only to serve as examples, and that many other embodiments are possible within the scope of the present invention as defined in the appended claims.

What is claimed is:

1. A directed energy weapon for use against a target, the weapon comprising:
   (a) a plurality of laser units, each of said laser units comprising:
      (i) a fiber laser generating an output beam from a fiber, said output beam conveying power of at least 1 kW,
      (ii) an objective lens arrangement for focusing said output beam into a focused beam directed towards the target, and
      (iii) a fine adjustment mechanism for adjusting a direction of said focused beam;
   (b) for each of said laser units, a beam deflector arrangement deployed to deflect a portion of said focused beam as a deflected beam in a direction in predefined relation to a direction of said focused beam;
   (c) an angle sensing unit deployed for receiving said deflected beams and generating an output indicative of a current direction of said deflected beam for each of said laser units; and
   (d) a controller associated with said angle sensing unit and said fine adjustment mechanisms, said controller being configured to actuate said fine adjustment mechanisms based on said output from said angle sensing unit to maintain a desired relative alignment between said directions of said focused beams,
   wherein said plurality of laser units is implemented as a two dimensional array of said laser units including a plurality of rows of said laser units, and wherein said beam deflector arrangement includes at least one pentaprism for each of said laser units deployed to generate a set of once-deflected beams in generally parallel relation from said laser units in each of said rows, said set of once-deflected beams being spaced apart by less than a diameter of said objective lens arrangement, said beam deflector arrangement further comprising an additional pentaprism for each of said rows deployed to deflect said set of once-deflected beams to form an array of deflected beams from a plurality of said rows.

2. The weapon of claim 1, wherein said beam deflector arrangement deflects no more than 1 percent of the energy of said focused beam.

3. The weapon of claim 1, wherein said beam deflector arrangement includes at least one pentaprism for each of said laser units.

4. The weapon of claim 1, wherein said fine adjustment mechanism comprises at least one actuator deployed for varying an angular position of a mirror.

5. The weapon of claim 1, wherein said plurality of laser units is implemented as a two dimensional array of at least ten of said laser units.

6. The weapon of claim 1, further comprising a tracking sensor deployed for tracking the target and evaluating alignment of said focused beams with the target, wherein said controller is further configured to actuate said fine adjustment mechanisms based on an output from said tracking sensor.

7. The weapon system of claim 6, wherein said tracking sensor is implemented as a directed energy weapon subsystem comprising:
   (a) a fiber laser generating an output beam from a fiber, said output beam conveying power of at least 1 kW;
   (b) an optical arrangement for focusing said output beam into a focused beam directed towards the target;
   (c) a fine adjustment mechanism associated with said optical arrangement and deployed to adjust a direction of said focused beam; and
   (d) a sensing arrangement deployed for:
      (i) sensing a part of said output beam reflected from an element of said optical arrangement so as to be indicative of a direction of propagation of said focused beam; and
      (ii) focal-plane sensing of radiation arriving at said optical arrangement from the target so as to allow tracking of the target.

8. A directed energy weapon for use against a target, the weapon comprising:
   (a) a plurality of laser units, each of said laser units comprising:
      (i) a fiber laser generating an output beam from a fiber, said output beam conveying power of at least 1 kW,
      (ii) an objective lens arrangement for focusing said output beam into a focused beam directed towards the target, and
      (iii) a fine adjustment mechanism for adjusting a direction of said focused beam;
   (b) for each of said laser units, a beam deflector arrangement deployed to deflect a portion of said focused beam as a deflected beam in a direction in predefined relation to a direction of said focused beam;
   (c) an angle sensing unit deployed for receiving said deflected beams and generating an output indicative of a current direction of said deflected beam for each of said laser units; and
   (d) a controller associated with said angle sensing unit and said fine adjustment mechanisms, said controller being configured to actuate said fine adjustment mechanisms based on said output from said angle sensing unit to maintain a desired relative alignment between said directions of said focused beams,
   wherein said fine adjustment mechanism comprises at least one actuator deployed for displacing a fiber tip of said fiber laser.

9. A directed energy weapon for use against a target, the weapon comprising:
   (a) a plurality of laser units, each of said laser units comprising:
      (i) a fiber laser generating an output beam from a fiber, said output beam conveying power of at least 1 kW,
      (ii) an objective lens arrangement for focusing said output beam into a focused beam directed towards the target, and (iii) a fine adjustment mechanism for adjusting a direction of said focused beam;
(b) for each of said laser units, a beam deflector arrangement deployed to deflect a portion of said focused beam as a deflected beam in a direction in predefined relation to a direction of said focused beam;
(c) an angle sensing unit deployed for receiving said deflected beams and generating an output indicative of a current direction of said deflected beam for each of said laser units;
(d) a controller associated with said angle sensing unit and said fine adjustment mechanisms, said controller being configured to actuate said fine adjustment mechanisms based on said output from said angle sensing unit to maintain a desired relative alignment between said directions of said focused beams; and
(e) a focus adjustment mechanism including at least one actuator deployed for displacing a fiber tip of said fiber laser so as to vary a length of an optical path from said fiber tip to said objective lens arrangement.

10. A directed energy weapon for use against a target, the weapon comprising:
(a) a plurality of laser units, each of said laser units comprising:
(i) a fiber laser generating an output beam from a fiber, said output beam conveying power of at least 1 kW,
(ii) an objective lens arrangement for focusing said output beam into a focused beam directed towards the target, and
(iii) a fine adjustment mechanism for adjusting a direction of said focused beam;
(b) for each of said laser units, a beam deflector arrangement deployed to deflect a portion of said focused beam as a deflected beam in a direction in predefined relation to a direction of said focused beam;
(c) an angle sensing unit deployed for receiving said deflected beams and generating an output indicative of a current direction of said deflected beam for each of said laser units;
(d) a controller associated with said angle sensing unit and said fine adjustment mechanisms, said controller being configured to actuate said fine adjustment mechanisms based on said output from said angle sensing unit to maintain a desired relative alignment between said directions of said focused beams; and
(e) a set of shutters or modulators associated with said controller and deployed to control a quantity of light from each of said laser units to said angle sensing unit, wherein said controller is configured to operate said set of shutters or modulators to modulate the deflected beams so as to facilitate angle sensing for each individual one of said laser units.

11. A directed energy weapon for use against a target, the weapon comprising:
(a) a fiber laser generating an output beam from a fiber, said output beam conveying power of at least 1 kW;
(b) an optical arrangement for focusing said output beam into a focused beam directed towards the target;
(c) a fine adjustment mechanism associated with said optical arrangement and deployed to adjust a direction of said focused beam; and
(d) a sensing arrangement deployed for:
(i) sensing a part of said output beam reflected from an element of said optical arrangement so as to be indicative of a direction of propagation of said focused beam; and
(ii) focal-plane sensing of radiation arriving at said optical arrangement from the target so as to allow tracking of the target,
wherein said output beam has a given wavelength conveying at least a majority of said power, and wherein said part of said output beam reflected from said element shares said given wavelength.

12. The weapon of claim 11, wherein said sensing arrangement comprises:
(a) a first sensing system deployed for focal-plane sensing of said part of said output beam reflected from said element of said optical arrangement so as to be indicative of a direction of propagation of said focused beam; and
(b) a second sensing system deployed for focal-plane sensing of radiation arriving at said optical arrangement from the target so as to allow tracking of the target.

13. The weapon of claim 11, wherein said optical arrangement includes a corner reflector deployed for reflecting a part of said focused beam back through said optical arrangement.

14. The weapon of claim 11, wherein said element of said optical arrangement reflecting part of said output beam is a surface of an objective lens of said optical arrangement.

15. The weapon of claim 11, wherein said fine adjustment mechanism comprises at least one actuator deployed for varying an angular position of a mirror.

16. A directed energy weapon for use against a target, the weapon comprising:
(a) a fiber laser generating an output beam from a fiber, said output beam conveying power of at least 1 kW;
(b) an optical arrangement for focusing said output beam into a focused beam directed towards the target;
(c) a fine adjustment mechanism associated with said optical arrangement and deployed to adjust a direction of said focused beam; and
(d) a sensing arrangement deployed for:
(i) sensing a part of said output beam reflected from an element of said optical arrangement so as to be indicative of a direction of propagation of said focused beam; and
(ii) focal-plane sensing of radiation arriving at said optical arrangement from the target so as to allow tracking of the target,
wherein said output beam includes a first wavelength component conveying power of at least 1 kW and a second wavelength component conveying a power at least two orders of magnitude smaller than said first wavelength component, and wherein at least one component of said optical arrangement is transparent to said first wavelength and is an at least partial reflector for said second wavelength, a reflected portion of said second wavelength component providing said part of said output beam sensed by said sensing arrangement.

17. A directed energy weapon for use against a target, the weapon comprising:
(a) a fiber laser generating an output beam from a fiber, said output beam conveying power of at least 1 kW;
(b) an optical arrangement for focusing said output beam into a focused beam directed towards the target;
(c) a fine adjustment mechanism associated with said optical arrangement and deployed to adjust a direction of said focused beam; and (d) a sensing arrangement deployed for:
  (i) sensing a part of said output beam reflected from an element of said optical arrangement so as to be indicative of a direction of propagation of said focused beam; and
  (ii) focal-plane sensing of radiation arriving at said optical arrangement from the target so as to allow tracking of the target, wherein said fine adjustment mechanism comprises at least one actuator deployed for displacing a fiber tip of said fiber laser.

* * * * *